United States Patent Office 2,698,323
Patented Dec. 28, 1954

2,698,323

PREPARATION OF ALKALI METAL SALTS OF PENICILLIN

Richard Pasternack, Islip, N. Y., assignor to Chas. Pfizer & Co., Inc., Brooklyn, N. Y., a corporation of Delaware No Drawing. Application May 2, 1950,
Serial No. 159,645

2 Claims. (Cl. 260—239.1)

This invention relates to the preparation of crystalline alkali metal salts of penicillin and has for its object the provision of novel and improved process for this purpose. More specifically, this invention relates to an improved process for the preparation of crystalline alkali metal salts of penicillin from organic base salts of penicillin.

The present application is a continuation-in-part of the copending applications Serial Nos. 788,676 filed November 28, 1947, 62,412 filed November 27, 1948, and 101,926 filed June 28, 1949, all now abandoned.

The methods hitherto known for the conversion of organic base salts of penicillin into alkali metal salts of the antibiotic have been lengthy and have involved a number of steps. One such method which has been used extensively is the acidification of an aqueous solution of an amine salt of penicillin with a strong acid and the extraction therefrom of the acid form of penicillin. Since the acid form of penicillin has a rather low stability, it has been necessary to cool such solutions and accomplish the step rapidly. The solution of the acid form of penicillin in a water-immiscible organic solvent must then be extracted with an aqueous solution of an alkali metal hydroxide, bicarbonate or carbonate. Crystalline alkali metal salt of penicillin is then obtained by concentrating the aqueous solution, or amorphous material may be obtained by complete dehydration of the concentrate, as from the frozen state. This process suffers from the disadvantage that it is both time-consuming and expensive when applied on a commercial scale and the various steps involve appreciable loss of the therapeutically active materials. A more direct process to avoid these expensive, time-consuming steps and attendant material losses is highly desirable.

According to the process of the present invention, I prepare crystalline alkali metal penicillin salt by treating a solution of organic amine penicillin salt with a suitable alkali metal salt. A number of organic amine salts of penicillin have been described in the chemical literature and these are suitable for use in our process. Among the salts which are suitable are those of primary, secondary, and tertiary amines where the groups involved are alkyl, aryl, cycloalkyl, or heterocyclic. The amine chosen must be of sufficient basic strength to form a reasonably stable salt with the organic acid, penicillin. The preparation of a variety of these compounds has been disclosed in the patent literature. Among the amines which I find particularly suitable for my process are triethylamine, procaine, β-diethylaminoethyl-p-benzoylaminobenzoate, dodecylamine, tri-n-butylamine, and others of a similar nature.

The alkali metal salts which I find suitable for the process of my invention are those alkali metal salts which are soluble in the organic solvents described below and which are not sufficiently acidic or basic to appreciably decompose penicillin when added to a polar solvent solution of the organic amine salt of penicillin in the chosen solvent. Examples of salts which I find useful are sodium iodide, potassium acetate, potassium propionate, potassium iodide, sodium thiocyanate, potassium thiocyanate, and sodium perchlorate. Other alkali metal salts with suitable polar organic solvent solubility may be used.

The solvents I find useful in my process include lower alkanols and lower ketones. These include primary, secondary, and tertiary alcohols having straight or branched chains. They also include straight or branched chain ketones. Examples of the solvents that I find particularly useful are acetone, methylethyl ketone, isopropyl alcohol, butyl alcohol, and mixtures thereof. The organic solvent must be inert in that it will not react appreciably with penicillin at the temperature employed and during the period of reaction. The organic solvent, furthermore, must be one in which the alkali metal salt is soluble, in which the amine salt is at least partially soluble and in which the resulting amine salt is soluble and in which the alkali metal salt of penicillin is but sparingly soluble. Although the process ordinarily is operated at approximately room temperature, elevated temperatures as high as 50° C. may be used in order to increase the rate of reaction.

Although the reactions disclosed in my application can be applied to penicillin salts other than those of penicillin "G" (benzylpenicillin), the latter is the most important of the penicillins from the therapeutic standpoint and most examples that I have given in my application are confined to this species. The order of addition of the reactants is not critical. The alkali metal salt may be added as a solid or dissolved in the chosen solvent to the solution or suspension of the amine salt of penicillin. Alternatively, the solid amine salt, a suspension or a solution thereof, may be added to the solution of the alkali metal salt in the chosen solvent. As long as sufficient time and suitable stirring is used, a high percentage of the amine salt of penicillin will be converted to the alkali metal salt.

In one method of carrying out this invention, a solution of sodium iodide in acetone is added to a suspension of procaine hydrochloride in acetone and the mixture is stirred for a short time. The crystalline sodium penicillin so produced is then filtered. A second method of carrying out my invention is to mix a solution of sodium perchlorate in acetone with procaine penicillin and stir for a period of an hour or more. The crystalline sodium penicillin is then filtered. A solution of potassium acetate in isopropanol may be added to a suspension of procaine penicillin in an acetone-isopropanol mixture. After stirring the mixture for a short time the crystalline potassium penicillin may be removed by filtration.

The amine salt of penicillin need not be isolated in a solid state before being used in the process I herein disclose. Thus, the amine salt of penicillin may be extracted from penicillin broth or penicillin concentrates to which have been added a suitable amine or amine salt. Examples of such a process have been disclosed in copending application No. 62,412 filed on November 27, 1948, by Dr. Richard Pasternack et al. If a non-polar solvent is used for the extraction, it may be removed by distillation and replaced with a suitable polar solvent. Alternatively, pure alkali metal salt may be converted by an analogous procedure through an amine salt which is extracted and then is converted into a different alkali metal salt. By this process it is possible to convert crystalline potassium penicillin through the triethylamine salt to crystalline sodium penicillin. A suitable alkali metal salt for this purpose is sodium thiocyanate.

These are but a few of the possible embodiments of my invention, more of which are described in the examples given below. These examples are given merely by way of illustration and are not intended to limit the scope of the invention.

*Example 1*

Eleven grams of potassium acetate are dissolved in 5 ml. of water. Five hundred ml. of isopropanol are added and the mixture is heated to 50° C. To this is added slowly with stirring a suspension containing 58.8 g. of 95% procaine penicillin G in 300 ml. of isopropanol, and the potassium penicillin G crystallizes immediately. The mixture is stirred for an additional 30 minutes at 50° C. The potassium penicillin G crystals are filtered, washed with warm isopropanol (45° to 50° C.) and dried. The white crystalline product weighed 32.5 g. having an $[\alpha]_D + 287°$ C.=1.8%, in water and an activity of 1595 u./mg., which represents a 92% recovery of the activity. No procaine was present.

The isopropanol solution is concentrated to a heavy syrup in vacuo which is dissolved in 50 ml. of water and the remaining isopropanol is removed in vacuo. The residual penicillin crystallizes as procaine penicillin. This is filtered, washed with ice water and dried. The crystalline procaine penicillin weighed 3.7 g. and this is 7%

Example 2

Ten grams of procaine penicillin (96% penicillin G) is suspended in 100 ml. of isopropanol at 35° C. A mixture of 2 g. of potassium acetate, 1 ml. water and 40 ml. of isopropanol is added slowly to the 10 g. slurry of procaine penicillin in isopropanol over a period of 30 minutes and the reaction mixture is stirred for an additional 30 minutes at 35° C. The crystalline potassium penicillin G is filtered, washed with warm isopropanol (35° C.) and dried. The white crystalline product weighed 6.0 g. (94.8% recovery), $[\alpha]_D+287°$ C.=1.8% in water.

The residual penicillin is recovered as procaine penicillin as described in Example 1. The procaine penicillin recovered weighed 0.35 g. (3.5% recovery).

Example 3

Two grams of sodium perchlorate are dissolved in 60 ml. of acetone at 45° C. A slurry of procaine penicillin G which contained 5.88 g. of procaine penicillin G, 20 ml. of acetone and 1.6 ml. of water is added slowly to the sodium perchlorate and acetone mixture. The sodium penicillin G soon crystallizes and it is filtered and washed with warm acetone. The crystalline sodium penicillin G weighed 1.75 g. (49.2% recovery), $[\alpha]_D+295°$, C.=1.8% in water and no procaine was present.

Example 4

Two grams of sodium perchlorate are dissolved in 80 ml. of methylethyl ketone at 60° C. To this mixture 5.88 g. of procaine penicillin G is slowly added. The procaine penicillin G dissolves and then the sodium penicillin G starts to crystallize. The crystalline sodium penicillin G is filtered and washed with warm methylethyl ketone (50° C.). The product weighed 3.0 g. (84.2% recovery), $[\alpha]_D+289°$, C.=1.8% in water.

Example 5

A mixture containing 5.1 g. potassium acetate, 2.5 ml. water and 300 ml. isopropanol is heated to 50° C. and to this is added a slurry containing 24 g. procaine dihydro-F penicillin and 100 ml. of isopropanol. A clear solution is obtained and crystals are obtained after cooling to 27° C. The potassium dihydro-F penicillin is filtered and washed with isopropanol. The product weighed 2.6 g. (17.3% recovery), $[\alpha]_D+283°$, C=1.8% in water and it contained 0% penicillin G.

The isopropanol is concentrated to 200 ml. in vacuo and a second crop of potassium dihydro-F penicillin is obtained. The product weighed 3.3 g. (21.9% recovery), $[\alpha]_D+290°$, C.=1.8% in water and it contained no penicillin G.

Example 6

One gram of potassium acetate and 5.88 g. of procaine penicillin G are mixed and ground in a mortar and pestle with a small volume of acetone to a thin paste. The mixture is transferred to a round-bottom flask with sufficient acetone so that the total volume of acetone is 275 ml. The above mixture is stirred for 16 hours at room temperature. The crystals are filtered and washed with acetone and with isopropanol. The crystalline potassium penicillin weighed 3.5 g. and it was 97% potassium penicillin, $[\alpha]_D+278°$, C.=1.8% in water. A 3.3 g. sample was pulped with 75 ml. of acetone and filtered, wt.=3.2 g., $[\alpha]_D+285°$, C.=1.8% in water.

Example 7

Three and three-tenths grams (3.3 g.) of potassium acetate is dissolved in 100 ml. of isopropanol and this is slowly added to 17.7 g. of procaine penicillin G suspended in a mixture of 250 ml. of acetone and 150 ml. of isopropanol over a period of 30 minutes at room temperature. The mixture is stirred for an additional 30 minutes, filtered and washed with an acetone-isopropanol mixture and isopropanol. The crystalline potassium penicillin weighed 9.9 g. (88.6% recovery), $[\alpha]_D+287°$, C.=1.8% in water.

Example 8

One and one-half grams (1.5 g.) of sodium perchlorate is dissolved in 100 ml. of isopropanol, filtered and heated to 50° C. A slurry of 5.88 g. of procaine penicillin G and 50 ml. of isopropanol is added and stirred for 30 minutes. The crystalline product is filtered and washed with warm isopropanol (50° C.). The crystalline sodium penicillin which is a mixture of sodium penicillin and procain perchlorate weighed 4.9 g., $[\alpha]_D+155°$ C.,= 1.8% in water. A 4.5 g. sample is pulped with 50 ml. of acetone, filtered and washed with acetone. The crystalline sodium penicillin weighed 1.8 g., $[\alpha]_D+295°$, C.= 1.8% in water.

Example 9

One and one-half grams (1.5 g.) of sodium perchlorate is dissolved in 20 ml. of acetone-isopropanol mixture (50—50), filtered and an additional 10 ml. of acetone-isopropanol mixture is added. To this solution 5.88 g. of procaine penicillin G is added and the mixture is stirred for 20 minutes, filtered and washed with acetone-isopropanol mixture (50—50) and finally with acetone. The crystalline sodium penicillin weighed 2.6 g., $[\alpha]_D+297°$, C.=1.8% in water.

The solvent is removed in vacuo and the residue is dissolved in 50 ml. of acetone. A second crop of sodium penicillin crystals weighed 0.2 g., $[\alpha]_D+296°$, C.=1.8% in water.

Example 10

One and one-half grams (1.5 g.) of sodium perchlorate is dissolved in 250 ml. of acetone, filtered and 5.88 g. of procaine penicillin G is added. The mixture is stirred for 2½ hours, at room temperature, filtered and washed with acetone. The crystalline sodium penicillin weighed 2.15 g., $[\alpha]_D+296°$, C.=1.8% in water.

The solvent is removed in vacuo and 50 ml. of acetone is added. A second crop of sodium penicillin is obtained and it weighed 0.65 g., $[\alpha]_D+295°$, C.=1.8% in water.

Example 11

Three and two-tenths (3.2) grams of sodium iodide is dissolved in 50 ml. of acetone and this is slowly added to a mixture of 11.8 grams of procaine penicillin G suspended in 200 ml. of acetone. The mixture is stirred for an additional 45 minutes, filtered and washed with acetone. The crystalline sodium penicillin weighed 5.9 g. (82.9% recovery) $[\alpha]_D+299°$, C.=1.8% in water.

Example 12

In 50 cc. of penicillin concentrate in the form of sodium salts, containing 17.8 g. of sodium penicillin, are dissolved 7 g. of triethylamine hydrochloride. The clear solution is extracted seven times with 25 cc. portions of chloroform. The combined chloroform extracts are concentrated under vacuum to the point of crystallization of the triethylamine penicillin. The residue is taken up with 250 cc. methylethyl ketone and to it is added a solution of 4 g. of sodium thiocyanate in 75 cc. of methylethyl ketone. The white sodium penicillin salt precipitates. It is collected on a Buechner funnel, washed with methylethyl ketone and dried. A penicillin concentrate in the form of calcium or potassium salts may be used as the starting material.

Example 13

43.4 grams of potassium penicillin are suspended in 350 cc. methylethyl ketone containing 28 cc. water. 16.1 grams powdered triethylamine hydrochloride are then added. The mixture is stirred for 15 minutes. Potassium chloride separates. 580 cc. of dry methylethyl ketone are now added to complete the precipitation of potassium chloride. The methylethyl ketone solution is then filtered and the potassium chloride cake washed with 100 cc. chloroform to dissolve triethylamine penicillin which may have crystallized with the potassium chloride. To the clear filtrate are added 9.6 g. sodium thiocyanate dissolved in 110 cc. of dry methylethyl ketone. The mixture is evaporated to about 150 cc. under vacuum. The crystallization obtained is separated by filtration, washed with dry methylethyl ketone and dried at 51° C. The white sodium salt obtained is about 99% pure.

Example 14

The chloroform obtained from the extraction of two liters of penicillin fermentation broth in the presence of 15 g. of β-dimethylaminoethyl-p-benzoylaminobenzoate is concentrated under vacuum at a low temperature (15–30° C.). When practically all of the chloroform has been removed, the residue is dissolved in methylethyl ketone. Potassium thiocyanate dissolved in methylethyl ketone is added. The mixture is stirred until crystals of potassium penicillin have separated. These are filtered, washed with methylethyl ketone and dried.

We claim:
1. Process for the formation of potassium penicillin which comprises metathetically reacting the procaine salt of penicillin and potassium acetate in lower alkanol solution.
2. The process of claim 1 wherein the lower alkanol is isopropanol.

No references cited.